United States Patent [19]
Wright

[11] 3,876,628

[45] Apr. 8, 1975

[54] PROCESSING OF MACROCYSTIS KELP TO CLARIFIED ALGIN LIQUOR

[75] Inventor: Gerald D. Wright, San Diego, Calif.

[73] Assignee: Kelco Company, San Diego, Calif.

[22] Filed: Apr. 9, 1973

[21] Appl. No.: 348,925

[52] U.S. Cl............................... 260/209.6; 210/20
[51] Int. Cl........................................... C08b 19/10
[58] Field of Search .............. 260/209.6; 210/20, 80

[56] References Cited
UNITED STATES PATENTS

| | | | |
|---|---|---|---|
| 2,036,922 | 4/1936 | Clark et al. | 260/209.6 |
| 2,036,934 | 4/1936 | Green et al. | 260/209.6 |
| 2,128,551 | 8/1938 | Le Gloahec et al. | 260/209.6 |
| 2,742,422 | 4/1956 | Saddington et al. | 210/96 |
| 2,742,423 | 4/1956 | Saddington et al. | 260/209.6 |
| 2,829,773 | 4/1958 | Saddington | 210/75 |
| 3,623,978 | 11/1971 | Boze | 210/80 |

FOREIGN PATENTS OR APPLICATIONS

| | | | |
|---|---|---|---|
| 1,222,394 | 2/1971 | United Kingdom | 210/80 |

*Primary Examiner*—Ronald W. Griffin
*Attorney, Agent, or Firm*—J. Jerome Behan

[57] ABSTRACT

The invention is directed to the recovery of haze-free algin liquor from crude liquor obtained by aqueous alkaline digestion of *Macrocystis pyrifera* kelp wherein the crude liquor comprising suspended solid matter, dispersed haze-producing particles and algin liquor is centrifuged to obtain a centrate containing dispersed haze-producing particles and the centrate is filtered through a bed filter with the centrate flowing in the direction of decreasing filter particle size in the bed. A filter made up of layers of sized gravel decreasing to a final layer of sized sand is preferred.

4 Claims, No Drawings

PROCESSING OF MACROCYSTIS KELP TO CLARIFIED ALGIN LIQUOR

BACKGROUND OF THE INVENTION

1. The Field of the Invention.

This invention relates to the recovery of algin from the brown alga *Macrocystis pyrifera* (giant kelp). Particularly, the invention relates to the recovery of clarified (essentially haze free) algin liquor from crude liquor of digestion of Macrocystis by alkaline solution, or partially processed crude liquor.

2. Background of the Prior Art.

Alginic acid, or the various metal alginates, are obtained from brown alga by digestion of the kelp after this has been macerated or comminuted. A crude liquor, which includes the dissolved algin, is obtained in combination with suspended solid material and very finely divided, including colloidal size material, dispersed haze-producing solid material. The alkaline digestion procedure is very old and many modifications have been made in order to produce better quality algin. Illustrative of two recent procedures are U.S. Pat. Nos. 2,036,922 and 2,036,934.

The crude liquor is physically separated by various procedures to recover algin liquor. The desired algin liquor for recovery of the dissolved algin is essentially haze free (clarified); in other words, virtually all of the suspended solid material from the digestion is removed to obtain the clarified algin liquor.

The classic separation procedure utilized plate and frame filters, normally with a precoat on the filter cloths. This operation required an enormous amount of hand labor and had a serious, and now unacceptable, disposal problem caused by the presence of the precoat filter aid. Subsequent developments involved the use of air flotation to remove the suspended solid particles followed by sedimentation to remove more solid particles and finally by plate and frame filtration or rotary vacuum filtration. A process of this type is described in U.S. Pat. Nos. 2,742,422 and 2,742,423.

At the present time, crude liquor from the digestion of *Macrocystis pyrifera* is filtered on a rotary vacuum filter using a very special type of perlite filter aid, as is described in U.S. Pat. No. 2,829,773. This technique, while effective in producing essentially haze-free algin liquor, has the serious drawbacks of high labor costs and high cost of disposal of the solids obtained.

For some time there has been in commercial operation a plant for the recovery of algin from the kelp *Ascophyllum Nodosum*. The process for *Ascophyllum Nodosum* involves conventional aqueous alkaline digestion followed by passing the total crude liquor to vibtating screens to remove the coarsest solids; additional coarse solids are removed by air flotation; and the partially processed crude liquor is then passed through nozzle centrifuges. The effluent liquor from the centrifuges is referred to as "centrate". The Ascophyllum centrate contains a maximum of 0.06% solids. By solids, it is meant the centrifugally dry solid material measured by volume obtained in a standard test. The standard test method places 100 ml. of centrate in a graduated cylindrical centrifuge tube; the material is then spun down on an International Model lab centrifuge for 30 minutes; the solids volume is then read on the tube.

A laboratory simulation of the commercial process for recovery of algin liquor from Ascophyllum was developed. In the laboratory simulation dry Ascophyllum is digested with aqueous alkaline solution; the digested material is diluted with water to a viscosity of approximately 30 centipoise at 160° F. (Measured by a Brookfield Model LVF Viscometer, No. 1 spindle.) The diluted crude liquor is aerated in a Waring Blender for 10–30 seconds and poured into a graduated cylinder. (This simulates the flotation cells used in the commercial process.) In the cylinder an upper layer of solid material and a lower sedimentation layer appear with a relatively clear center layer. The center layer is separated and centrifuged in a laboratory centrifuge. The centrate from the final centrifuging is essentially the same as that obtained in the commercial Ascophyllum operation.

Efforts to process crude liquor from the digestion of *Macrocystis pyrifera* using laboratory simulation and small scale commercial equipment, such as that used on Ascophyllum, failed to produce an acceptable, essentially haze-free algin liquor.

In an attempt to determine the why of the inability to process in a satisfactory manner, the composition of the crude liquor from Macrocystis and the crude liquor from Ascophyllum was studied. It was found that Ascophyllum crude liquor diluted to 30 cps contained 10% total solids. Macrocystis crude liquor diluted to 30 cps contains on the order of 20% total solids. In addition, it was observed that the Macrocystis solids contained a larger volume of dispersed material of a colloidal and gelatinous nature.

SUMMARY OF THE INVENTION

It has been discovered that algin liquor of essentially haze-free character (containing no more than 0.06% solids) and even clear algin liquor containing 0.01% or less solids, can be produced from the crude liquor, or partially processed crude liquor, obtained by aqueous alkaline solution digestion of the brown alga *macrocystis pyrifera*. This crude liquor comprises a suspension of solid matter, a dispersion of haze-producing solid particles, and algin liquor. The crude liquor itself, or partially processed crude liquor with some of the solids removed, is centrifuged to obtain a centrate composed of haze-producing solid particles dispersed in algin liquor. The centrate is filtered through a bed filter with the centrate flowing in the direction of decreasing filter particle size in the bed to obtain an essentially haze-free clarified algin liquor filtrate. Preferably, the bed filter comprises a plurality of layers of filter particles with said layers decreasing in particle size in the direction of centrate flow. Typically, the coarsest layers are made up of sized gravel, that is, gravel where each fragment is approximately the same size, and at least the finest layer is made up of sized sand.

DESCRIPTION OF THE INVENTION AND EMBODIMENTS

Crude liquor from the digestion of *Macrocystis pyrifera* (giant kelp) with aqueous alkaline solution can be physically separated to an essentially haze-free algin liquor by the process of this invention. Crude liquor, as used herein, includes not only the total mixture of algin liquor and solids as obtained in the digestion of the kelp, but also this total crude liquor diluted with water or other algin liquor, or crude liquor which has been processed by a technique such as settling, or flotation, even crude filtration, to remove some of the solid content of the liquor.

It is to be understood that the digestion of the Macrocystis may be carried out by anyone of the well-known procedures and the digestion procedure is not part of the improvement made over the prior art physical separation processes by this invention.

In the process of the invention, the crude liquor is centrifuged to remove the larger particles of suspended and dispersed matter to produce an effluent consisting essentially of algin liquor containing suspended therein haze-producing particles, some of which at least are of colloidal dimensions. Hereinafter, this centrifuge effluent is spoken of as centrate. The centrifuging may be carried out on any equipment which is adapted to handle the finely divided suspended solids contained in total crude liquor. Total crude liquor from the digestion of Macrocystis which has been diluted to the preferred 30 cps viscosity (at 160° F.) resembles a puree.

The centrate is not of acceptable quality for the production of algin for essentially any commercial use of alginic acid or its derivatives, such as calcium alginate, sodium alginate or propylene glycol esters. It has been discovered that acceptable quality algin liquor can be obtained by passing the centrate through a bed filter with the centrate flowing in the direction of decreasing filter particle size in the bed.

The bed filter may be formed of a great variety of particle sizes with a substantially continuous change in particle size with the largest particles being at the point of entry of the centrate into the filter and the smallest particles being at the point of exit of the filtrate. It is to be understood that the direction of flow of the centrate is always in the direction of decreasing size of the particles in the filter bed.

As a practical matter, the conventional bed filter, which is made up of a number of distinct layers, each layer containing uniformly sized particles, is the preferred type of filter for use in the invention. Particularly preferred is the bed filter wherein the coarsest and coarser layers are formed from sized gravel and the finer and finest layers are formed from sized sand.

Gravel, as used herein, is intended to include any unconsolidated mixture of rock fragments or pebbles. Sand, as used herein, is intended to include any loose, granular, gritty particles of worn or disintegrated rock, finer than gravel and coarser than dust.

It is to be understood that the bed filter will be so constructed that the effluent emerging from the finest particles will be essentially haze free (clarified), that is, contain no more than 0.06% solids. Effluents containing as little as 0.01%, or less, solids can be obtained. Algin liquor containing this amount of dispersed solids is suitable for virtually all uses. In the case of algin to be used in beer beverage, it may be necessary to have a final solution filtration through a filter aid either in a plate and frame filter, or a rotary filter.

It has been observed that the bed filter can be readily and simply regenerated by passing either cold or hot water through the filter at a rate such that the bed is substantially fluidized. The solids trapped within the bed pass out of the bed with the wash water and, if the rate of flow of wash water is controlled, the bed settles back into its previous orientation of particle size layers and is ready immediately for another cycle of centrate filtration.

EXAMPLES

Failures

Total crude liquor from digestion of Macrocystis was processed on a Sweco screen; this screening failed because the screen was quickly blinded by solids. The screened liquor was passed into a Sharples P-3000 super decanter; the effluent was passed through a De Laval ACVO-1 provided with an AVCO-3 bowl, nozzle-type separator. This operation failed owing to the high solid content remaining in the liquor after the final centrifuging. Additional work on this particular procedure demonstrated that the P-3000 was unable to scroll the solids and the ACVO-1 nozzles plugged frequently.

The efforts to use centrifuges for the removal of solids from crude liquor obtained from Macrocystis kelp was continued. A program utilizing Centrico SK1K, model centrifuge, failed because of low capacity and the inability to produce an acceptable solids content of the centrate.

Various combinations utilizing Bauer Hydrasieves, DSM Screens, Kreb Hydrocyclones, Centrico Strainers and Sweco Screens, all of these pieces of equipment, alone or in combination, failed to produce acceptable quality final algin liquor.

A Centrico automatic desludger centrifuge, SAMS, does not utilize nozzles and does not require prior screening to remove particles. However, the centrate was unacceptable because the solids content could not be reduced below 0.10%.

EXAMPLES 1-2

Tests were made on crude liquor from which many of the solids had been removed by settling or other procedures using various types of filter aid. It was discovered that coarse filter aid positioned on a support did a surprisingly good job of removing the coarser solids. Still better filtration was obtained when a layered filter using filter aids of different fineness was used to filter this crude liquor with the crude liquor being charged to the coarsest layer first.

After the filter aid work, a crude bed filter made up of sand was used to filter this particular crude liquor. It was found that passing the crude liquor through the filter in the direction of decreasing sand size gave acceptable quality filtrate.

EXAMPLE 3

As a result of the sand bed filter work, tests were carried out on a development size commercial bed filter named, "The De Laval Immediumfilter". This is described in a sales brochure identified as: S.A. 1521 7/70 WFM 5M. The particular bed filter used in this example was an open top cylinder having a hemispherical bottom, provided with an entry for centrate or regeneration air and water. The cylindrical shell was provided with a plate spaced from the bottom, which plate was provided with a bubble cap arrangement which permitted even distribution of liquid across the bed. The cylinder was 15 inches internal diameter affording a surface area of 1.3 square feet. Near the top of the cylinder a grid of horizontal metal bars was provided. This grid tended to hold back the final sand layer even though the final sand layer extended approximately two inches above the top of the grid. Above the grid a conical collector was positioned for the removal of filtrate.

The filter bed within the shell, measured from the bubble cap tray consisted of: an 8 inch layer of gravel having a sieve size of one inch. Next above, an 8 inch layer of gravel having a sieve size of ¼ inch. Next above, an 8 inch layer of No. 12 Silica sand (2-3 millimeter); next above, a layer 5 feet thick of No. 16 Silica sand (1-2 millimeter).

In a typical run total crude liquor from the digestion of *Macrocystis pyrifera* with aqueous algin solution was diluted with water to a viscosity of about 30 centipoises. This diluted crude liquor had a consistency roughly that of a puree.

The diluted crude liquor was passed through a Centrico SAMS centrifuge to separate the removable solids content. The centrate had a solids content of 0.08-0.10% over the course of a 12-hour run. The centrate was maintained at a temperature within the range of 138°-150° F. during the course of the 12-hour run.

The warm centrate was introduced below the bubble cap tray of the bed filter. The flow rate of introduction during the first hour was three gallons (U.S.) per minute. After the first hour the flow rate was maintained in the range of 4.5-5 GPM.

For the first 8 hours of the run the filtrate showed a Trace or less of solids. After 8 hours there was a measurable increase in solids content. At the end of 4 hours, the solids content was only 0.01%.

After the 12 hour run the bed filter was regenerated in the following manner: for a period of 3 minutes air was introduced at a rate of 2 cubic feet per minute. Then, cold water was introduced below the bubble tray for 30 minutes at a rate of 15 GPM. At the end of 30 minutes the wash effluent was clear. It was necessary to add 3 gallons of sand to the top of the bed to bring the level about 2 inches above the grid.

EXAMPLE 4

In an 8 hour run, centrate containing 0.2% solids was introduced below the bubble cap tray at a temperature of 174°-185° F. at a rate ranging from 15 to 22 gallons per minute. For the 8 hour run period, the effluent from the bed filter showed a trace amount of solids. The bed filter was regenerated by having air introduced below the bubble tray for 5 minutes at 25 cubic feet per minute. Then cold water was introduced below the bubble tray for 25 minutes at a rate of 90 GPM at which time the wash effluent was clear.

EXAMPLE 5

A 31 hour run was carried out on centrate containing close to 0.2% solids. The centrate was introduced below the bubble tray at a temperature of 178°-185° F. at a rate of 30 GPM. Over this 31 hour period, the effluent showed only a trace of solids.

A more complicated regeneration procedure was used in view of the length of this run although normally the simple regeneration of the preceding examples is sufficient. First, for 5 minutes 25 cfm of air were introduced below the bubble tray. Hot water was introduced below the bubble tray for 8 minutes at 90 GPM. Then the filter was permitted to drain for 5 minutes.

Secondly, for 5 minutes air was introduced beneath the bubble tray at 25 cfm. Then hot water was introduced beneath the bubble tray for 8 minutes at 90 GPM. Then cold water was introduced below the bubble tray for 40 minutes at a rate of 100 GPM.

Lastly, hot water was introduced below the bubble tray for 6 minutes at a rate of 90 GPM. Then, the filter was permitted to settle for a time of 10 minutes with the water turned off. Then, the filter was drained in a period of 4 minutes to complete the regeneration.

The above Examples, 3-5, are selected examples from a large number of runs, all of which came within the scope of the invention as described hereinbefore and as claimed hereinafter.

Thus, having described the invention, what is claimed is:

1. In the process of obtaining clarified algin-liquor from the brown alga *Macrocystis pyrifera* wherein the Macrocystis is digested with aqueous alkaline solution to produce a crude liquor comprising a suspension of solid matter, a dispersion of haze producing solid particles, and algin-liquor, and clarified algin-liquor is physically separated from crude liquor, the improvement which consists essentially of:

centrifuging solids-containing-algin-liquor on an automatic desludger centrifuge to obtain a centrate upflow of haze-producing solid particles dispersed in algin-liquor, and filtering said centrate through a bed-filter with the centrate flowing in the direction of decreasing filter-particle size in the bed, to obtain an essentially haze-free, clarified algin-liquor filtrate.

2. The process of claim 1 wherein said bed-filter comprises a plurality of layers of filter particles, said layers decreasing in particle size in the direction of centrate flow.

3. The process of claim 2 wherein the coarsest layers are made up of sized gravel and the finest layer is made up of sized sand.

4. In the process of obtaining clarified algin-liquor from the brown alga *Macrocystis pyrifera* wherein the Macrocystis is digested with aqueous alkaline solution and the resulting liquor diluted with water to a viscosity of about 30 centipoise to produce a crude liquor comprising a suspension of solid matter, a dispersion of haze producing solid particles, and algin-liquor, and clarified algin-liquor is physically separated from said crude liquor, the improvement which consists essentially of:

centrifuging said solids-containing-algin-liquor on an automatic desludger centrifuge to obtain a centrate of haze-producing solid particles dispersed in algin-liquor, and filtering said centrate upflow through a bed-filter with the centrate flowing in the direction of decreasing filter-particle size in the bed, to obtain an essentially haze-free, clarified algin-liquor filtrate.

* * * * *

UNITED STATES PATENT OFFICE
CERTIFICATE OF CORRECTION

Patent No. 3,876,628          Dated  April 8, 1975

Inventor(s)  Gerald D. Wright

It is certified that error appears in the above-identified patent and that said Letters Patent are hereby corrected as shown below:

Claim 1, column 6, line 28, delete the word "upflow".

Claim 1, column 6, line 30, after the word "centrate" insert the word "upflow".

Signed and Sealed this twenty-second Day of July 1975

[SEAL]

Attest:

RUTH C. MASON
Attesting Officer

C. MARSHALL DANN
Commissioner of Patents and Trademarks